US009411790B2

(12) United States Patent
McKinney et al.

(10) Patent No.: US 9,411,790 B2
(45) Date of Patent: Aug. 9, 2016

(54) SYSTEMS, METHODS, AND MEDIA FOR GENERATING STRUCTURED DOCUMENTS

(71) Applicants: Steven Victor McKinney, Ross, CA (US); Ron Severdia, San Anselmo, CA (US)

(72) Inventors: Steven Victor McKinney, Ross, CA (US); Ron Severdia, San Anselmo, CA (US)

(73) Assignee: Metrodigi, Inc., Larkspur, CA (US)

( * ) Notice: Subject to any disclaimer, the term of this patent is extended or adjusted under 35 U.S.C. 154(b) by 317 days.

(21) Appl. No.: 13/952,364

(22) Filed: Jul. 26, 2013

(65) Prior Publication Data

US 2015/0033116 A1    Jan. 29, 2015

(51) Int. Cl.
*G06F 17/00* (2006.01)
*G06F 17/22* (2006.01)
*G06F 17/27* (2006.01)
*G06F 17/21* (2006.01)
*G06F 17/30* (2006.01)

(52) U.S. Cl.
CPC .......... *G06F 17/2247* (2013.01); *G06F 17/218* (2013.01); *G06F 17/2264* (2013.01); *G06F 17/2745* (2013.01); *G06F 17/21* (2013.01); *G06F 17/211* (2013.01); *G06F 17/227* (2013.01); *G06F 17/30011* (2013.01); *G06F 17/3089* (2013.01); *G06F 17/30616* (2013.01); *G06F 17/30864* (2013.01)

(58) Field of Classification Search
CPC ............ G06F 17/272; G06F 17/30873; G06F 3/0481; G06F 17/21; G06F 17/2247; G06F 17/30616; G06F 17/211; G06F 17/30011; G06F 17/30864; G06F 17/3089; G06F 17/218; G06F 17/227

USPC .......... 715/854, 817, 777, 802, 804–805, 273
See application file for complete search history.

(56) References Cited

U.S. PATENT DOCUMENTS

| 4,772,782 | A | 9/1988 | Nonat |
| 7,313,754 | B2 * | 12/2007 | McLure ............... G06F 17/2247 715/234 |
| 7,587,381 | B1 * | 9/2009 | Remy et al. ........ G06F 17/30616 |
| 8,719,169 | B2 | 5/2014 | McKinney et al. |
| 2004/0181746 | A1 | 9/2004 | McLure et al. |

(Continued)

FOREIGN PATENT DOCUMENTS

| WO | WO2010077701 A1 | 7/2010 |
| WO | WO2011151709 A2 | 12/2011 |
| WO | WO2013110082 A1 | 7/2013 |

OTHER PUBLICATIONS

International Search Report and Written Opinion of the International Searching Authority mailed Jun. 3, 2013 in Patent Cooperation Treaty Application No. PCT/US2013/022579, filed Jan. 22, 2013.

*Primary Examiner* — Quoc A Tran
(74) *Attorney, Agent, or Firm* — Carr & Ferrell LLP

(57) ABSTRACT

Systems, methods, and media for generating structured documents are provided herein. Methods may include receiving digital source content, the digital source content having source data elements where each source data element includes one or more attributes, determining the one or more attributes for each of the source data elements, tagging each of the source data elements with an identifier based upon their one or more attributes, the identifier defining a function for a particular source data element with a structured document, and generating a structured document from the tagged source data elements.

28 Claims, 5 Drawing Sheets

(56) References Cited

U.S. PATENT DOCUMENTS

| | | |
|---|---|---|
| 2004/0205568 A1 | 10/2004 | Breuel et al. |
| 2004/0225986 A1 | 11/2004 | Lin et al. |
| 2008/0168073 A1 | 7/2008 | Siegel et al. |
| 2008/0243828 A1 | 10/2008 | Reztlaff et al. |
| 2008/0263438 A1 | 10/2008 | Dias et al. |
| 2010/0110011 A1 | 5/2010 | Milne et al. |
| 2011/0181894 A1 | 7/2011 | Martin |
| 2012/0079606 A1 | 3/2012 | Evans et al. |
| 2012/0240085 A1 | 9/2012 | Sim et al. |
| 2013/0067313 A1 | 3/2013 | Leguin et al. |
| 2013/0174017 A1* | 7/2013 | Richardson ............. G06F 17/21 715/234 |
| 2013/0191728 A1 | 7/2013 | McKinney et al. |
| 2013/0275254 A1 | 10/2013 | McKinney et al. |
| 2014/0237333 A1 | 8/2014 | McKinney et al. |
| 2015/0199314 A1 | 7/2015 | Ratnakar |
| 2015/0228197 A1 | 8/2015 | McKinney et al. |

* cited by examiner

SYSTEMS, METHODS, AND MEDIA FOR GENERATING STRUCTURED DOCUMENTS

FIELD OF THE TECHNOLOGY

Embodiments of the disclosure relate to the generation of structured documents that may in turn be used to generate electronic books or publications. Systems, methods, and media provided herein may be utilized to transform unstructured or semi-structured source content (e.g., source container) into a structured document. The structured document may include an automatic formatting of source document elements based upon attributes associated with the source document elements.

BACKGROUND OF THE DISCLOSURE

Current methods for generating electronic books from digital source content may produce undesirably formatted electronic books. For example, digital source content such as a document stored in a portable document file (PDF) format may not include sufficient formatting information for source data element, such as text and images, that allows for the proper generation of an electronic book or publication. For example, without proper formatting information, an electronic book generated from a PDF document having no proper identifiers for different types of text, such as title text and body text, may conflate the source content elements such as a body text and list text such that it is difficult or impossible to differentiate the body text from the list text. Indeed, one would expect to see title text positioned and sized differently relative to body text for a page within an electronic book. Similar difficulties arise when converting other source content elements such as images and executable code related components such as quizzes, test, and so forth.

SUMMARY OF THE DISCLOSURE

According to some embodiments, the present technology may be directed to methods for converting digital source content into a structured document, using an element ranking system comprising a processor and a memory for storing executable instructions, the processor executing the instructions to perform the method comprising: (a) receiving digital source content, the digital source content comprising source data elements where each source data element includes one or more attributes; (b) determining the one or more attributes for each of the source data elements; (c) tagging each of the source data elements with an identifier based upon their one or more attributes, the identifier defining a function for a particular source data element within a structured document; and (d) generating a structured document from the tagged source data elements.

According to other embodiments, the present technology may be directed to methods for transforming a first electronic book that was generated according to a first electronic book standard into a second electronic book generated according to a second electronic book standard. The methods may include: (a) determining characteristics from content of the first electronic book, the characteristics at least defining a layout of the content that defines how the content of the first electronic book is displayed; and (b) transforming content into the second electronic book according to the second electronic book standard in such a way that when the content of the second electronic book is displayed, the display of the content of the second electronic book is substantially similar to the display of the content of the first electronic book.

According to additional embodiments, the present technology may be directed to a system for generating an electronic book according to the electronic book standard. The system may comprise: (a) an interface that receives digital source content, the digital source content comprising source data elements where each source data element includes one or more attributes; (b) a processor for executing instructions stored in memory; and (c) a memory for storing executable instructions, wherein the instructions comprise: (i) a parsing module that determines the one or more attributes for each of the source data elements; (ii) an assignment module that tags each of the source data elements with an identifier based upon their one or more attributes, the identifier defining a function for a particular source data element with a structured document; and (iii) a document generator module that generates a structured document from the tagged source data elements.

According to other embodiments, the present technology may be directed to a method for converting unstructured content into a structured document, the method comprising: (a) receiving unstructured digital source content; (b) extracting data elements included in the unstructured digital source content; (c) determining attributes for each of the data elements; (d) assigning a weighting to each of the attributes of the data elements; (e) classifying each of the data elements based upon the weighting, wherein the weighting is indicative of a content type for a data element, further wherein the weighting is compared against weighting of other data elements of the unstructured digital source content in order to classify each of the data elements; and (f) generating an structured document from the data elements based in accordance with their content types or attributes.

According to other embodiments, the present technology may be directed to a non-transitory computer readable storage media that includes instructions for generating a structured document by: (a) receiving digital source content, the digital source content comprising source data elements where each source data element includes one or more attributes; (b) determining the one or more attributes for each of the source data elements; (c) tagging each of the source data elements with an identifier based upon their one or more attributes, the identifier defining a function for a particular source data element with a structured document; and (d) generating a structured document from the tagged source data elements.

In some embodiments, the non-transitory computer-readable medium may include instructions that when executed perform a method comprising: (a) receiving unstructured digital source content; (b) extracting data elements included in the unstructured digital source content; (c) determining attributes for each of the data elements; (d) assigning a weighting to each of the attributes of the data elements; (e) classifying each of the data elements based upon the weighting, wherein the weighting is indicative of a content type for a data element, further wherein the weighting is compared against weighting of other data elements of the unstructured document in order to classify each of the data elements; and (f) generating an structured document from the data elements based in accordance with their content types or attributes.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
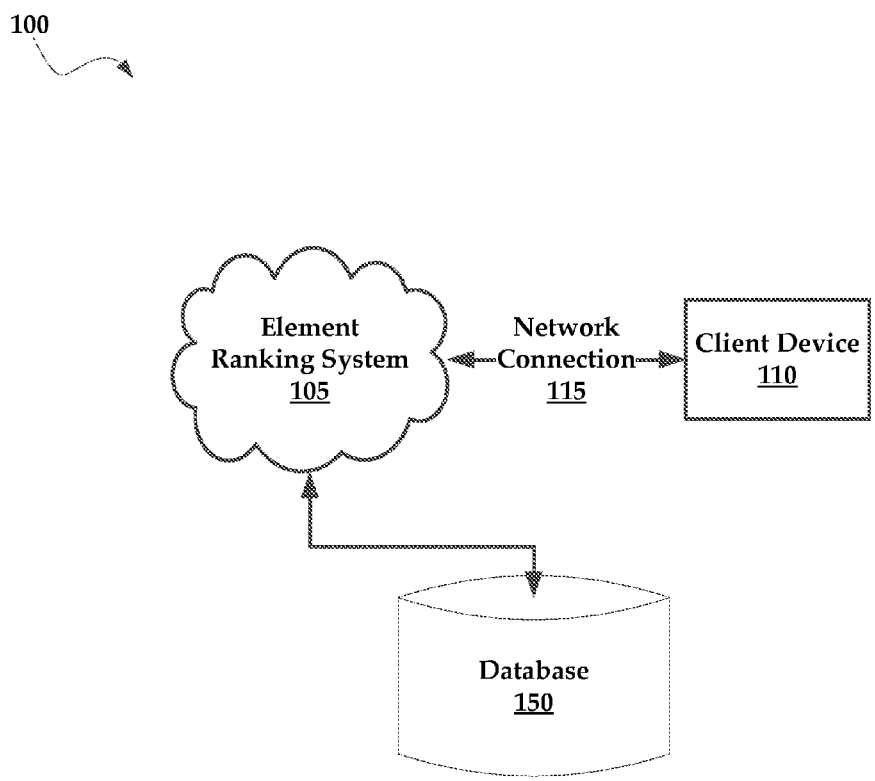
FIG. 1 illustrates an exemplary architecture for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally and interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

More specifically, the present technology may convert unstructured source containers into structured documents, which can, in turn, be transformed into electronic books or publications. Digital source content may include image files, XML files, portable document files (PDF), and word processing files, Adobe InDesign®, and QuarkXPress®. While the above-described file types have been provided for as example document formats that may be converted into structured content by the present technology, one of ordinary skill in the art will appreciate that many other types of files may likewise be utilized in accordance with the present disclosure.

Generally speaking, the present technology is directed to generating structured documents from unstructured or semi-structured content. The present technology may utilize an element ranking system that converts any content to semantic content using various algorithms that determine content rank, value, and description based on a variety of factors. It will be understood that the present technology may advantageously generate a structured document that provides a clean markup for easy editing, while reducing the amount of code required in generating such a markup. Also, the structured document may minimize or eliminate conflicts between the digital source content and the electronic publication.

In some instances, the structured document may be used to maintain visual and code consistency, especially across a plurality devices that may utilize different electronic document formats. Also, the use of structured documents may increase portability for reuse and management of content, as well as allowing for optimum flexibility for forward/backward compatibility between various electronic document formats.

The present technology intuitively parses the digital source content, sometimes referred to as a "source container", for source data elements, such as text, images, video, executable-code segments, and the like. It will be understood that each of these source data elements may include one or more attributes that define or represent a function for a particular source data element with a structured document. For example, a function may include "header", which defines a set of characters which are typically placed on top of body text. Furthermore, the header text includes a font size that is larger than that of the body text, and may be bold or have a font type that his different than the body text.

The present technology may attempt to determine the attributes of all source data elements in the source container and tag each of these elements with their corresponding attributes. The present technology may then compare the attributes of a source data element with previously tagged source data elements in a training corpus. Additionally, source data elements may be assigned an identifier based on a comparison between attributes of source data elements extracted from the source container.

These and other advantages of the present technology will be discussed in greater detail below with reference to the collective drawings.

FIG. 1 illustrates an exemplary system 100 for practicing aspects of the present technology. The system 100 may include an element analysis and ranking system, hereinafter system 105, which may be implemented as a webserver or in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the system 105 may include a distributed group of computing devices such as web servers that do not share computing resources or workload. Additionally, the system 105 may include a single computing system that has been provisioned with executable instructions as described in greater detail below.

End users may access and interact with the system 105 via the client device 110 using a web-based interface. The system 105 may communicatively couple with a client device 110 via a network connection 115. The network connection 115 may include any one of a number of private and public communications mediums such as the Internet.

Figure 2:
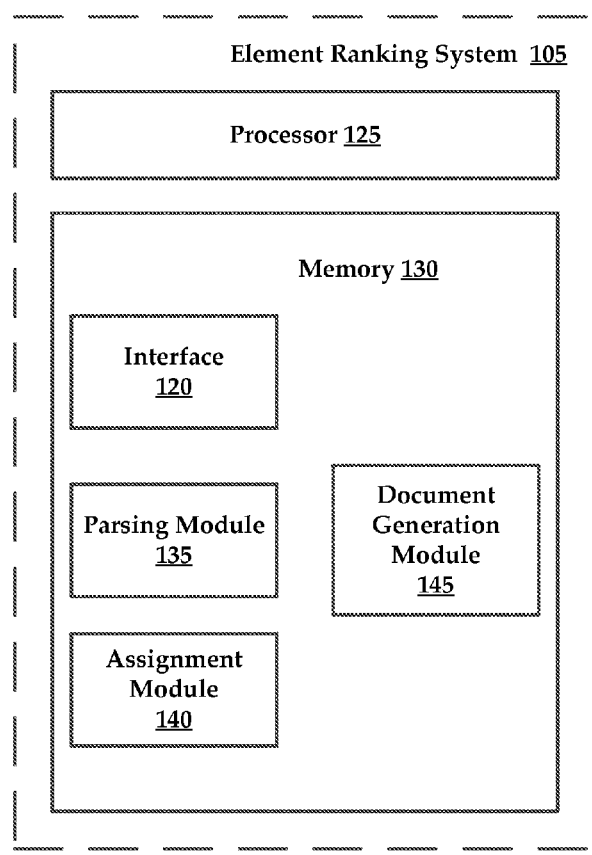
FIG. 2 illustrates an exemplary element ranking system, for use in accordance with the present technology.

FIG. 2 illustrates additional details regarding the system 105. In some embodiments, the system 105 may comprise an interface 120, a processor 125, and a memory 130 for storing executable instructions (e.g., logic) that provide the various functionalities described herein. According to some embodiments, the executable instructions may comprise a parsing module 135, an assignment module 140, and a document generator module 145. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the may include separately configured web servers. Also, the modules may be provisioned with a cloud as described above.

In some instances, the interface 120 may include any logical and/or physical interface that allows the system 105 to be communicatively coupled with another system, device, or network. For example, the interface 120 may allow for the system 105 to couple with a network (e.g. via network connection 115) to receive digital source content (e.g., source containers) from various other systems or devices, such as the client device 110. Also, the interface 120 may be utilized to communicate structured documents to a client device 110. In other instances, the system 105 may provide access to structured documents through various graphical user interfaces generated by the system 105. Users may view or edit these structured documents, and specifically users may edit or update assigned identifiers for source data elements, allowing the correction of improper or erroneous identifier assignments. It will be understood that an identifier may also herein be referred to as a classification for a source data element.

The digital source content received by the system 105 may have any one of a number of different formats or containers. For example, a container may comprise ePub (HTML, CSS, JavaScript, XML), Adobe InDesign®, PDF, Apple Pages®, XML, and Microsoft Word®—just to name a few. Additionally, the digital source content may include images. For example, the digital source content may include a JPEG or TIFF format image of a page or a portion of a page of a book.

After receiving the digital source content, the system 105 may execute the parsing module 135 to extract source data elements from the source content. For example, the parsing module 135 may identify source data elements such as words, sentences, paragraphs, images, executable-code, videos, lists, and so forth, included in the source content.

In some instances, all possible source data elements are extracted and/or parsed from the source container. Data may be stored in a native container format and structure within a database 150. Retaining the source data elements in their native format allows for reevaluation of source content (and corresponding attributes) before, during, or after extraction and parsing.

It will be understood that an "attribute" of a data element may be described as anything that defines a function, style, placement, size, appearance, or other aspect with regard to a structured document or electronic publication. More specifically, in some instances, the attributes of a data element may allow the system 105 to determine a content type or classification for the data element, as well as other aspects such as the placement of the data element on a page, or the size of the element on the page. Again, these aspects are related to the content type for the data element. For example, a set of words may include attributes such as: (a) a font size that is 40 percent larger than other text element on the same page; and (b) an italicized font. Knowing these attributes the assignment module 140 may tag the set of words (e.g., source data element) with an identifier, such as "Title Text". The assignment module 140 tags this element based upon comparisons between the source data element and previously tagged source data elements in a training corpus, or as compared against other source data elements extracted from the source container. Again, the comparison may occur at the attribute level.

It will be understood that a source data element may include a single word, a combination of words such as a phrase, sentence, or paragraph, or may also include an image, a video, or other media.

With further regard to determining an identifier that is appropriate for source data elements, the parsing module 135 may be configured to weight or "score" various attributes which are determined for the source data elements. In some instances, the parsing module 135 may assign point values to attributes. These point values may be used to determine an appropriate identifier for the source data element.

Provided below are example attributes for source data elements that may be determined, detected, read, selected, extracted, extrapolated, conflated, derived, or determined by the parsing module 135. In some instances the source container may include pre-defined identifiers that can be used by the parsing module 135 in lieu of performing any of the following methods for determining attributes for source data elements. In some instances the source container may include identifiers for only a portion of the data elements in the source container, thus requiring the assignment module 140 to determine identifiers for at least a portion of the source data elements.

Non-limiting example attributes related to text and code elements may include font family, font type, font format, font style, and font size. Other attributes related to leading and line height, as well as text alignment and justification may also be determined. In some instances the parsing module 135 may detect legibility (relative versus intended) for written textual content, digraphs, and/or ligatures. Also, the parsing module 135 may be configured to detect structure, style, and metadata attributes by evaluating metadata tags present with some source data elements.

According to some embodiments, the attributes may include language attributes for data elements. Language attributes may be determined from a contextual analysis, such as when the parsing module 135 evaluates surrounding text for clues that help identify a language attribute for a source data element. In other instances, language attributes may be determined from a grammatical analysis of a source data element such as hyphenation, punctuation, capitalization, case, capitonyms, acronyms, alternate spellings, numeronyms, and so forth. Other language attributes may be determined from a linguistic analysis using, for example, language stemming, word frequency, and/or word proximity.

In some embodiments, attributes may include page or book attributes such as page size that may define specific page dimensions or reflowable or responsive size attributes. These attributes may also include book size, page count, as well as content length where the number of words or characters for a page or a book is determined. Also, attributes that indicate a relation or proportion of content to page or content to book may likewise be utilized in accordance with the present technology. Additionally, units of measurement or frequency of these items within a page or book may also be determined. Furthermore, page styles, such as "master page" items and/or styles may also be determined by the parsing module 135. Again, some of these attributes may be determined by evaluating metadata or other information included in the source container.

Additional attributes may include element properties (specific or relative to other elements) with respect to a page or a book. For example, element properties may include position properties such as frequency, alignment, and spacing relative to other elements on a page or a portion of a page. Also, an element property may include size properties such as aspect ratio, shape, and/or proportion (specific or relative to other elements)—just to name a few. Also, occurrence properties may be determined such as the frequency of occurrence of a data element for a page or within a book, or a frequency of specificity or relativity of an individual property of a source data element. Other properties include content format, metadata and structure, as well as visual appearance properties such as color or color space.

In some instances, the parsing module 135 may be unable to identify any attributes for a source data element. In these instances, the assignment module 140 may tag, assign, classify, or otherwise identify the source data element with a default identifier. For example, the assignment module 140 may, by default, assign an identifier of "Body Text" as default, when the majority of the source data elements have been found by the parsing module 135 to have attributes that are indicative of Body Text.

Because the system 105 may utilize digital source content such as images, in some instances, the system 105 may be configured to extract data elements by initially processing images using, for example, optical character recognition techniques. Other techniques for identifying pictures or other visual content in the image file may also be utilized.

The parsing module 135 may detect any of the aforementioned attributes for each source data element and assign a weighting scale or score to each source data element. Various exemplary weighting calculations will be described in use case scenarios provided below.

After a weighting or scoring has occurred for the various source data elements, the assignment module 140 may assign or tag each source data element with a particular identifier. More specifically, the assignment module 140 may compare a weighting of attributes for a source data element to a plurality of identifiers that define specific content types or functions for an element within a page or a document. For example, an identifier may include "body" or "header" where body text is typically smaller in size relative to header text. Moreover, header text is usually displayed above body text on a page, and header text may have a larger font size or type relative to body text. Furthermore, body text should be more prevalent on a page than header text.

Exemplary identifiers may include, but are not limited to, body, text, list, quote, caption, header, footer, table, page number, h1, h2, h3, h4, h5, h6, P (Paragraph), span (range of characters), strong (bold font), em (emphasis such as italics), table, and container. The container identifier may include sub-types such as div, page-number, title, element group, and so forth. Other identifiers which would be known to one of ordinary skill in the art may also be utilized.

Each of the described identifiers may include a permutation of values or expected information that is directly related to attributes that are analyzed for the source data elements. For example, an identifier may be considered a representation of a set of attributes and their associated or expected weights. A header identifier may specify that a header includes a set number of characters in length and that these characters are positioned at least a number of lines above a block of text of any size, and that the set of characters is within a set distance from the top of the page. Each of these attributes may have a determined weight. Furthermore, to be attributed or assigned the "header" identifier, a source data element may be required to have a weight or score a plurality of attributes that meets the expected value for the header identifier.

For example, the parsing module 135 may determine or calculate points for each possible attribute for a source data element. The assignment module 140 may compare the attributes and values for a source data element to the expected values for the identifiers and select an appropriate identifier for the source data element.

Exemplary Use Cases

Assuming that a set of text elements have been extracted by the parsing module 135 from a source container. The parsing module 135 may determine a line of text to have the following attributes: (a) Specific position of 50 pixels from the top edge and left edge of the container format; (b) A font size that is 200% larger than an average of the rest of the content on the current page; (c) A bold font style; (d) A content length of two words; (e) Initial capitalization and no terminating punctuation; (Style, keyword, or metadata information identifying it as "title" or "header"; and A consistent frequency of the above attributes throughout the book.

For each of these attributes, the parsing module 135 may add a point for "header" value. When comparing against the header value of the remaining source data elements that were extracted, the element with the highest value for "header" would get subsequently ranked and assigned a header identifier (e.g. h1, h2, h3, etc.).

In another example, the system 105 may evaluate cookbook recipe ingredients found on a page of a book. Assuming that a set of text elements have been extracted by the parsing module 135 from a source container. The parsing module 135 may determine a line of text to have the following attributes: (a) A font size within 20% in size of the determined overall body size; (b) Elements in close proximity to one another; (c) Fractions, mathematical characters, or other units of measurement at the start of most or all the elements; (d) Immediately follows an element identified/weighed as a title or header; (e) A consistent frequency of the above attributes throughout the book; (f) No numbers immediately followed by periods at the start of each element.

For each of these attributes, the parsing module 135 may add a point for a "list" identifier value. The elements with the highest value for "list" would get assigned (e.g. li) and the specific type of list would be "ul" or unordered list as determined by attribute (f). The assignment module 140 may assign an identifier (e.g. a CSS class) of "recipe—list" to the source data elements.

In another exemplary use case, the system 105 may receive a XML source container and extract source data element therefrom. It will be understood that the source format may already support assignation of elements and identifiers, such as when elements are pre-defined. In such cases, the user may be presented with advanced options to customize the output or dynamically assign weighting based on specific criteria.

In an addition example use case, the system 105 may process source data elements such as an educational learning unit. Assuming that source data elements have been extracted by the parsing module 135 from a source container, the parsing module 135 determines that the source data elements have the following attributes: (a) Sub-header elements (fonts at least 20% larger than the determined overall body size and smaller than the determined primary header) starting with sequential numbers; (b) The word "Objective" exists in the sub-header element; (c) A figure, graphic, or table element with an accompanying header (that may contain the words "Figure", "Table", "Activity" or "Lab") in close proximity which includes a sequential number; (d) An area with a background color different than the page background color; (e) Elements with a position above an area with a different background color; and (f) Words within the determined body element with different attributes (color, size, etc.) and containing "fig", "figure", "table" with preceding/subsequent numbering.

The parsing module 135 determines that source data elements with attributes of item (a) receive a point value towards a "header" value and compared against other source data elements with a value for "header" greater than one to determine a header ranking of that element for this content ("header1", "header2", etc.). It will be understood that the word "item" refers to an attribute or collection of attributes for one or more source data elements.

The presence of item (b) adds three points to the "education" value for this element and one point for each element as determined by items (c)-(e). The presence of item (c) adds a point value to container "learn—unit" for each element determined and additional points for "figure", "table", "image" as determined by the element's properties. The header identified in item (c) receives a two points for "header" and any sequence indicator/element receives a unique identifier. Item (d) gives a point to the "callout" value and item (e) gives a point value to the "header" and "education" values for this element. Elements determined with attributes from item (f) receive a "header" point for elements containing "fig", "figure", "table", and are assigned a unique identifier for associated sequential numbering, and assigned identifiers, by the assignment module 140, according to other attributes determined (e.g. "red", "alternate-row-colors").

Elements with the highest identifier values for "header" and "education" along with values for elements such as figures, tables, and so forth, in close proximity indicate the elements should be grouped within a "learning-unit" and assigned a corresponding identifier of "learning-unit". The assignment module 140 assigns each element within that group a derived value (including unique identifiers) from a "parent" association, such as "education-header" or "education figure-7.3".

In another example, the system 105 may evaluate source data elements indicative of an educational quiz and learning check. Assuming that source data elements have been extracted by the parsing module 135 from a source container, the parsing module 135 determines that the source data elements have the following attributes: (a) A group of text elements starting with sequential letters or numbers (or a combination) in close proximity; (b) A group of text elements immediately following individual elements identified starting with sequential letters or numbers (or a combination) in close proximity; and (c) The words "Quiz", "Check", or "Review" exist.

The presence of item (a) causes the parsing module 135 to add a point to a "container" value for each element with an identifier of "quiz-item" with the sequential letters/numbers enclosed in a separate numerical identifier of "quiz-item-order". The presence of item (b) causes the parsing module 135 add a point to "quiz-answer" for each element identified with a unique identifier on the individual numbers in the numerical sequence. Item (c) adds a point to "header" value and "container" value for "quiz-title". Derived from the combination of a "quiz-title" ID and multiple "quiz-items", all elements are contained and associated with one another in a new ID "learning-quiz".

In another use case, the parsing module 135 may determine the presence and identification of source data element that include a gallery or image series. Assuming that source data elements have been extracted by the parsing module 135 from a source container, the parsing module 135 determines that the source data elements have the following attributes: (a) A sequence of figures, images or tables; (b) Elements are in near proximity; (c) Elements contain at least one aligned edge; (d) Textual element(s) in near proximity to a figure, graphic or table element with a font size of up to 20% than the determined overall body size; (e) Textual elements optionally vertically oriented/aligned.

To determine identifiers for various source data elements, the parsing module 135 may determine that items (a), (b), and (c) all add a point to a singular "group" value specific to these elements. The presence of item (d) causes the parsing module 135 to add a point to "image" and two points to "caption".

Elements with the highest value for images within a series or group are assigned a "container" identifier by the assignment module 140 and common "image-group" identifiers for each image element. Items with a relatively high value for "caption" are assigned the "caption" identifier. An additional identifier (e.g. "vertically-aligned", "RTL") is assigned to any element with the lowest value (greater than one) based on attributes derived from item (e).

In another embodiment, the system 105 may determine attributes and identifiers for page numbering type source data elements. Assuming that source data elements have been extracted by the parsing module 135 from a source container, the parsing module 135 determines that the source data elements have the following attributes: (a) A combination of a sequential number and/or series of words; (b) Consistent location at the top or bottom of pages; and (c) Consistent white space around the elements.

The presence of item (a) causes the parsing module 135 to add two points and the presence of item (b), to add a point towards a container "page-number" value. The presence of item (b) causes the parsing module 135 to add two points to either the "header" or "footer" value. Additionally, an identifier (e.g. a CSS class) of "page-number" and either "verso" or "recto" would be added by the assignment module 140 as a secondary identifier. Thus, in some instances, a source data element may be tagged with a first, second, or additional identifiers.

In another use case, the system 105 may determine attributes and identifiers for citation or glossary entry. Assuming that source data elements have been extracted by the parsing module 135 from a source container, the parsing module 135 determines that the source data elements have the following attributes: (a) Subordinate text element with a font size at least 20% smaller than the determined overall body size; (b) Position near the bottom; (c) May contain the word "Source" or "Note"; and (d) May be preceded by a sequence of numbers.

The presence of item (a) causes the parsing module 135 to add a point for this element to the "caption" value. The presence of item (b) causes the parsing module 135 to add two points and the presence of item (c) causes the parsing module 135 to add three points to the "caption" value. The presence of item (b) may also cause the parsing module 135 to add a point to the "footer" value. The element with the highest value for "caption" and "footer" combined would be assigned a "footnote" identifier by the assignment module 140, with a unique identifier assigned to the numerical sequence.

In an additional use case the system 105 may determine attributes and identifiers for quotes and callouts. Assuming that source data elements have been extracted by the parsing module 135 from a source container, the parsing module 135 determines that the source data elements have the following attributes: (a) Sequence of words; (b) A font size at least 20% larger than the determined overall body size; (c) Near proximity to the determined body element(s); (d) Containing quotation marks; (e) An area with a background color (e.g. blue) different than the page background color; and (f) Elements with a position above an area with a different background color.

The presence of item (a) causes the parsing module 135 to add a point for determining the grouping of words or individual elements. The presence of item (b) causes the parsing module 135 to add a point for "title" and with that point, while another point is added for the presence of item (c). The presence of item (d) causes the parsing module 135 to add three points to the "quote" value. The presence of items (e) and (f) causes the parsing module 135 to add a point for each attribute to the "quote" value. The element with the highest value for "quote" gets assigned a "block quote" identifier by the assignment module 140 and includes an instance-specific class of "blue" (or another attribute of the element). An element with a highest value for attribute (d) may receive an assignation of "quote-mark" by the assignment module 140 on the quotation marks.

Again, it will be understood that the comparatives or higher or lower relate to comparisons of attribute/identifier values for source data elements, as compared to other source data elements belonging to the same page or book as one another. In other instances, the comparison may include a comparison between source data elements for a page or a book, relative to source data elements found in a training corpus of exemplary data elements.

Each time a source container is processed by the system 105 to extract, process, and tag source data elements with identifiers, the tagged source data elements may be stored in the database 150 in a training corpus. Thus, as the training corpus grows in size, the relative intelligence and accuracy of the system 105 may increase for processes that involve comparisons with the training corpus.

It will be understood that each of the exemplary data elements preferably includes one or more attributes that define an identifier. Thus, by comparison, if the attributes of the source data element substantially match the attributes of an exemplary data element, the source data element may be tagged with the same identifier. The system 105 can account for matches that are not 100% complete, allowing for close matching between elements. If a source data element matches some, but not all of the attributes of an exemplary data element in a training corpus, the system 105 may determine if the more important attributes of the elements match. For example, if the source data element is compared to exemplary data elements that include a "header" identifier, it may be less relevant that the source data element being evaluated has one or more additional words than the exemplary data elements. If the size and location of the source data elements are identical, the system 105 may proceed with tagging the source data element with the header identifier. Suitable adjustments to this tagging may occur at a later stage, such as by end user evaluation and feedback processes, which will be described in greater detail below.

With further regard to processing source data elements, after the weighting and analysis process is complete, each element may be assigned any combination of properties, metadata, descriptions, and/or attributes. For example, the assignment module 140 may provide the source data element with a semantic naming. By way of non-limiting example, a source data element that is determined to have a high header value may be assigned a semantic name such as <header> or <h1> or other CSS class attribute or HTML5 attribute. This semantic name allows for appropriate processing of the element according to the desired electronic publication format that will be used.

The assignment module 140 may also adjust or modify the structure of a source data element based upon determined attributes. For example, the attributes for a set of source data elements may be used to determine that the set of source data element should be nested in a particular manner. The change in structure may be at least partially due related to the desired format of the electronic publication that will be generated from the structured document.

Also, as mentioned briefly above, the assignment of identifiers may occur on various levels of granularity. For example, if a parent source data element is found to have a particular identifier, child elements associated with that parent source data element may be assigned a similar or related identifier.

The assignment module 140 may also adjust the order of source data elements in a structured document based upon their attributes and determined identifiers, as well as a styling for each of the source data elements. In some instances, the assignment module 140 may consolidate attributes or identifiers for elements that repeat within a page or document or source data elements that have similar styles, metadata, or any of the other described attributes.

After the assignation of identifiers, the document generator module 145 may be executed to assemble tagged source data elements into a structured document that is stored in the database 150. The structured document may have any format including, but not limited to, ePub (HTML, CSS, JavaScript, and XML), plain text, CSV, and XML. Other suitable structured document formats that would be known to one of ordinary skill in the art may also likewise be utilized.

In some instances, the structured document may highlight or otherwise identify the presence of source data elements that have been tagged with default identifiers. In other embodiments, source data elements that have been tagged with default identifiers may be included in a list that is associated with the structured document.

According to some embodiments, the tagging of source data elements may be overseen by an end user. That is, an end user may be allowed to review, change, or delete an assigned identifier for a source data element. This feature may be particularly advantageous when the parsing module 135 is unable to determine any attributes for a source data element. Again, in these instances the source data element would be assigned a default identifier. If this default identifier is incorrect, the user may change the default designation. When the default designation is updated, the source data element and corresponding attributes may be used in future analyses to correctly identify source data elements that would have been tagged with a default identifier. In some instances, the updated source data element may be stored in the training corpus in the database 150. In some instances, the system 105 may utilize a combination of previously tagged source data elements and user-defined source data elements to arrive at a suitable identifier for a source data element.

Additionally, the training corpus may be sub-divided into domain specific training corpuses. If a domain (e.g., subject matter) for a book can be determined, one or more domain appropriate training corpuses may be selected for use. For example, if the source container is found to include source data for a cookbook, only cookbook related structured documents or tagged source data elements for cookbook domains may be utilized.

In addition to text and media, the system 105 may be configured to extract, identify, and tag executable code elements that are commonly found in electronic documents. More specifically, the parsing module 135 may examine the digital source content for code content, where the code content defines executable code. Next, the parsing module 135 may determine one or more code attributes for the code content that allows the assignment module 140 to tag the code content according to the one or more code attributes. Finally, the document generator module 145 arranges the code content within the structured document based upon the tagging of the code content.

Figure 3:
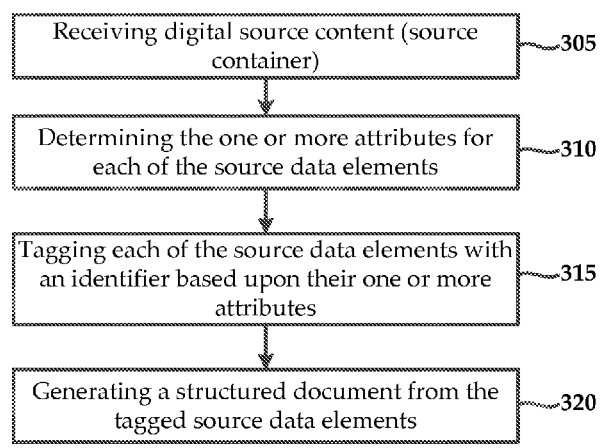
FIG. 3 is a flowchart of an exemplary method for converting unstructured content into a structured document.

FIG. 3 is a flowchart of an exemplary method for converting digital source content into a structured document, using an element ranking system comprising a processor and a memory for storing executable instructions. The processor executes the instructions to perform the method that includes receiving 305 digital source content (source container). As mentioned above, the digital source content comprises source data elements where each source data element includes one or more attributes. Also, the method includes determining 310 the one or more attributes for each of the source data elements, as well as tagging 315 each of the source data elements with an identifier based upon their one or more attributes.

Again, the identifier has been stated as defining a function for a particular source data element with a structured document. This "function" may include, for example, header, body, title, list, or any of the other described functions, which are associated with the identifiers described in greater detail above.

The method also includes generating 320 a structured document from the tagged source data elements. In some instances, the structured document may be further processed or utilized to generate an electronic book or publication. The arrangement of the structured document, including constituent source elements being tagged with identifiers, provides a useful and flexible base structure that can be converted into a plurality of electronic book or publication formats. That is, the structured document is agnostic to a final electronic book or publication format, but retains necessary structure relative to source data elements that ultimately allow for the creation of various electronic books having widely varying formats, while ensuring that data elements are displayed in a manner that is consistent with their attributes.

Figure 4:
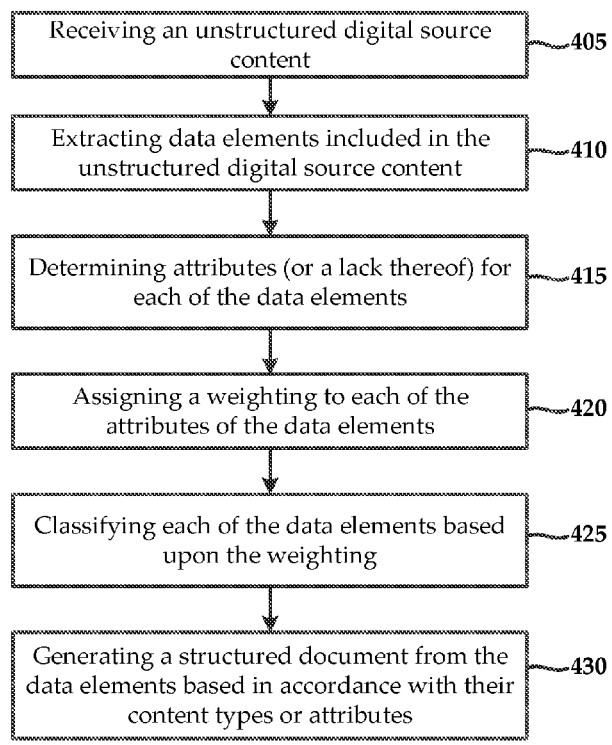
FIG. 4 is a flowchart of another exemplary method for converting unstructured content into a structured document.

FIG. 4 is a flowchart of another exemplary method for converting digital source content into a structured document, using an element ranking system comprising a processor and a memory for storing executable instructions. The processor executes the instructions to perform the method that includes receiving 405 an unstructured digital source content and extracting 410 data elements included in the unstructured digital source content. Also, the method includes determining 415 attributes for each of the data elements (or in some instances determining that no attributes can be found).

The method may include assigning 420 a weighting to each of the data elements based upon the attributes of the data elements. More specifically, the weighting or scoring may include determining a weighting for each of the attributes of the data elements.

Also, the method includes classifying 425 each of the data elements based upon the weighting, wherein the weighting is indicative of a content type for a data element. Additionally, the weighting is compared against weighting of other data elements of the unstructured digital source content in order to classify each of the data elements. Additionally, the method includes generating 430 a structured document from the data elements based in accordance with their content types or attributes.

Figure 5:
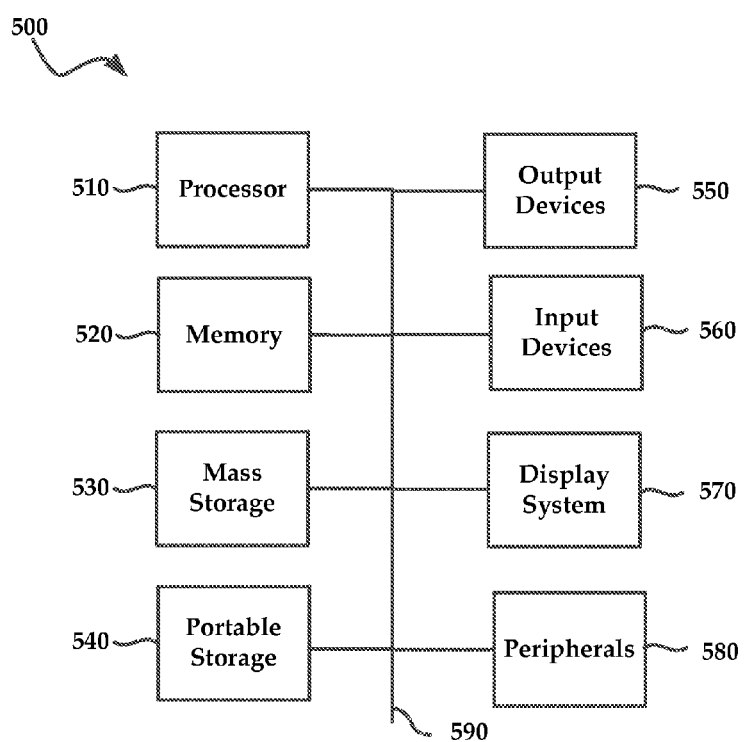
FIG. 5 illustrates an exemplary computing system that may be used to implement embodiments according to the present technology.

FIG. 5 illustrates an exemplary computing device 500 (also referred to as computing system 500 and system 500) that may be used to implement an embodiment of the present systems and methods. The system 500 of FIG. 5 may be implemented in the contexts of the likes of computing devices, networks, servers, or combinations thereof. The computing device 500 of FIG. 5 includes a processor 510 and main memory 520. Main memory 520 stores, in part, instructions and data for execution by processor 510. Main memory 520 may store the executable code when in operation. The system 500 of FIG. 5 further includes a mass storage device 530, portable storage device 540, output devices 550, user input devices 560, a display system 570, and peripherals 580.

The components shown in FIG. 5 are depicted as being connected via a single bus 590. The components may be connected through one or more data transport means. Processor 510 and main memory 520 may be connected via a local microprocessor bus, and the mass storage device 530, peripherals 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 can store the system software for implementing embodiments of the present technology for purposes of loading that software into main memory 520.

Portable storage device 540 operates in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computing system. Peripherals 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for converting digital source content into a structured document, the method comprising:
   using an element ranking method comprising:
   receiving digital source content, the digital source content comprising source data elements;
      determining one or more attributes for each of the source data elements;
      comparing an attribute and value for the source data elements to expected values for an identifier;
   tagging each of the source data elements with the identifier based upon the attribute, wherein the identifier defines a function for a particular source data element with a structured document;
      generating a structured document from the tagged source data elements;
   determining, for data elements of the digital source content, a semantic naming convention, a structure, a granularity, an order, and a styling by comparing the data elements of the digital source content to classified data elements of previously generated structured documents;
      identifying data elements of the digital source content that match classified data elements of previously analyzed structured documents; and
      assigning any of the semantic naming convention, the structure, the granularity, the order, and the styling of the classified data elements of previously generated structured documents to the matching data elements.

2. The method according to claim 1, wherein the digital source content is extracted from an at least partially unstructured document.

3. The method according to claim 1, wherein the digital source content comprises one or more images.

4. The method according to claim 1, further comprising:
   comparing the one or more attributes for a source data element to a corpus of exemplary data elements, wherein each of the exemplary data elements includes one or more attributes that define the identifier; locating an exemplary data element that matches the one or more attributes for the source data element; and tagging the data element with the identifier of the exemplary data element.

5. The method according to claim 4, further comprising: determining if the source data element does not match any of the exemplary data elements; and assigning a default identifier to the source data element that does not match any of the exemplary data elements.

6. The method according to claim 5, further comprising any of: highlighting the source data element having the default identifier in the structured document; and adding the source data element to a list of source data elements having default identifiers.

7. The method according to claim 6, further comprising: receiving feedback from an end-user relative to the default identifier; and updating the identifier for the source data element based upon the feedback.

8. The method according to claim 7, further comprising updating the corpus of exemplary data elements with the source data element having the updated identifier.

9. The method according to claim 4, further comprising including the tagged source data elements into the corpus of exemplary data elements.

10. The method according to claim 4, wherein the corpus of exemplary data elements is selected based upon a domain which is determined for the digital source content.

11. The method according to claim 1, further comprising assigning a priority level to at least one of the one or more attributes of the source data element.

12. The method according to claim 1, further comprising: examining the digital source content for code content, the code content defining executable code; determining one or more code attributes for the code content; tagging the code content according to the one or more code attributes; and modifying the code content within the structured document based upon the tagging of the code content.

13. The method according to claim 1, further comprising: determining if the source data element does not match any of the classified data elements of the previously generated structured documents; and assigning a default identifier to the source data element that does not match any of the classified data elements of previously analyzed structured documents.

14. The method according to claim 1, wherein at least a portion of the one or more attributes for each of the data elements is pre-defined in the source document that comprises the data elements.

15. The method according to claim 1, further comprising generating an electronic publication from the structured document, the electronic publication being configured for use with an electronic document reader.

16. The method according to claim 1, wherein any of the digital source content or the structured document comprises any format selected from ePub, HTML, JavaScript, Cascading Style Sheets, Extensible Markup Language, plain text, Comma Separated Value data, and images.

17. A system for converting digital source content into a structured document, the system comprising:

an interface for receiving digital source content, the digital source content comprising source data elements where each source data element includes one or more attributes;

a processor; and a memory for storing executable instructions that comprise: a parsing module that determines the one or more attributes for each of the source data elements;

an assignment module that:
  compares an attribute and value for the source data elements to expected values for an identifier and tags each of the source data elements with the identifier based upon their one or more attributes, the identifier defining a function for a particular source data element with a structured document;
  determines, for data elements of the digital source content, a semantic naming convention, a structure, a granularity, an order, and a styling by comparing the data elements of the digital source content to classified data elements of previously generated structured documents;
  identifies data elements of the digital source content that match classified data elements of previously analyzed structured documents; and
  assigns any of the semantic naming convention, the structure, the granularity, the order, and the styling of the classified data elements of previously generated structured documents to the matching data elements; and
a document generator module that generates the structured document from the tagged source data elements.

18. The system according to claim 17, wherein the digital source content comprises one or more images.

19. The system according to claim 17, wherein the parsing module is further configured to: compare the one or more attributes for the source data element to a corpus of exemplary data elements, wherein each of the exemplary data elements includes one or more attributes that define the identifier; locate an exemplary data element that matches the one or more attributes for the source data element; and wherein the assignment module is configured to tag the data element with the identifier of the exemplary data element.

20. The system according to claim 19, wherein the assignment module is further configured to: determine if the source data element does not match any of the exemplary data elements; and assign a default identifier to the source data element that does not match any of the exemplary data elements.

21. The system according to claim 17, wherein the assignment module is further configured to: receive feedback that includes the updated identifier for the source data element, wherein the updated identifier has been changed from the initial identifier that was previously assigned to the source data element by the assignment module; and update a corpus of exemplary data elements with the source data element having the updated identifier.

22. The system according to claim 17, further comprising including the tagged source data elements into a corpus of exemplary data elements.

23. The system according to claim 17, wherein the parsing module is further configured to: examine the digital source content for code content, the code content defining executable code; and determine one or more code attributes for the code content; wherein the assignment module: tags the code content according to the one or more code attributes; and arranges the code content within the structured document based upon the tagging of the code content.

24. The system according to claim 17, wherein at least a portion of the one or more attributes for each of the data elements is pre-defined in the source document that comprises the data elements.

25. The system according to claim 17, wherein the document generator module is further configured to generate an electronic publication from the structured document, the electronic publication being configured for use with an electronic document reader.

26. The system according to claim 17, wherein any of the digital source content or the structured document comprises any format selected from ePub, HTML, JavaScript, Cascading Style Sheets, Extensible Markup Language, plain text, and Comma Separated Value, and images.

27. A non-transitory computer readable medium having instructions for performing a method comprising:
  using an element ranking method comprising:
    receiving digital source content, the digital source content comprising source data elements;
    determining one or more attributes for each of the source data elements;
  comparing an attribute and value for the source data elements to expected values for an identifier;
    tagging each of the source data elements with the identifier based upon the attribute, wherein the identifier defining a function for a particular source data element with a structured document;
    generating a structured document from the tagged source data elements;
  determining, for data elements of the digital source content, a semantic naming convention, a structure, a granularity, an order, and a styling by comparing the data elements of the digital source content to classified data elements of previously generated structured documents;
    identifying data elements of the digital source content that match classified data elements of previously analyzed structured documents; and
  assigning any of the semantic naming convention, the structure, the granularity, the order, and the styling of the classified data elements of previously generated structured documents to the matching data elements.

28. The method according to claim 27, further comprising calculating a score for the structured document that is based upon weighting determined for each of the data elements based upon their attributes.

* * * * *